UNITED STATES PATENT OFFICE.

PAUL PICKL, OF CHICAGO, ILLINOIS, ASSIGNOR TO EMMA PICKL, OF CHICAGO, ILLINOIS.

METHOD OF PRODUCING HYDROGEN PEROXID.

1,271,611.　　　　　　Specification of Letters Patent.　　Patented July 9, 1918.

No Drawing.　　　Application filed November 16, 1917.　Serial No. 202,410.

*To all whom it may concern:*

Be it known that I, PAUL PICKL, a citizen of Switzerland, residing at Chicago, county of Cook, and State of Illinois, have invented certain new and useful Improvements in Methods of Producing Hydrogen Peroxid, of which the following is a specification.

The invention relates to a method of producing hydrogen peroxid, whereby solutions in any desired strength may be prepared by anybody at any time.

Hydrogen peroxid is valued highly as a disinfecting agent for the reason that it is not poisonous and can be used internally or externally without injurious effects. Hydrogen peroxid moreover is distinguished from other disinfectants, such as phenol, lysol, etc., because it does not irritate the skin or cause an itching.

In view of these advantages hydrogen peroxid would be universally used were it not for the fact that the strength of the solution originally produced rapidly weakens, until finally its chemical properties and its value as a pharmaceutical agent are practically extinct. A good many attempts have been made to overcome these difficulties and to employ hydrogen peroxid so as to maintain its original strength, thus it is usually sold in brown bottles and carefully guarded against the influence of heat or light so as to prevent decomposition of the liquid. These steps undoubtedly have improved matters somewhat, but have not enabled the storing of the hydrogen peroxid for an indefinite period. It is also impossible to ship the liquid great distances as the shaking incident to shipping invariably causes decomposition of the liquid into water and oxygen. It is furthermore to be borne in mind that the commercial product available as a 3% solution diminishes in strength.

It therefore constitutes the principal object of my invention to provide a method for producing hydrogen peroxid whereby the latter is available at any time in the desired strength and with the possession of its pharmaceutical properties.

A further object consists in providing ingredients necessary to form hydrogen peroxid in powder or tablet form, so that a solution may be readily prepared whenever required entailing the advantage of having always a fresh prepared solution, which is of great importance in the treatment of wounds, and the like.

A further object aims at the provision of means for preventing decomposition of the ingredients irrespective of the length of time for which they are stored.

It is also an object of the invention to employ the ingredients in concentrated form entirely free of water or other admixtures, thus enabling the preparation of solutions at any time of any desired strength by merely placing the ingredients in a predetermined amount of water, whereby a solution of hydrogen peroxid of required strength is formed.

Hydrogen peroxid can be produced by various reactions, all of which require several ingredients, including the application of acids, so that the reactions cannot be produced in a convenient manner nor without a knowledge of chemistry. The employment of barium peroxid is feasible only for manufacturing purposes. Sodium peroxid is also objectionable, once because it is dangerous to dissolve in water and then because a lye is formed in the reaction as by-product. Even perborate cannot be used advantageously as the addition of acids is required. It is moreover too expensive to be used freely.

My invention thus is predicated on the employment of ingredients obtainable in tablet or powder form and of constant consistency, which readily dissolve in water and generate a certain amount of hydrogen peroxid. To produce hydrogen peroxid of a certain strength, if the weight of the tablet is known, it is only necessary to measure the amount of water in which the tablet is dissolved in accordance with the strength of the solution to be obtained.

The reaction relied upon to produce hydrogen peroxid embraces the decomposition of metallic peroxids by the agency of an acid of which the following reaction is typical:

$$Na_2O_2 + H_2SO_4 = Na_2SO_4 + H_2O_2$$

To secure ingredients in solid form experiments were made with sodium peroxid powder and other powders having acid properties. In selecting the proper acid to be used ium peroxid powder organic or in-
acids were considered. Oxalic acid
table among the organic acids can-
sed, as dry mixtures of sodium per-
th organic bodies are highly ex-
ind in addition, when dissolved in
ie hydrogen peroxid causes organic
be decomposed into water and car-
id.
g the inorganic acids phosphoric
oric acid or acid sodium sulfate is
for the purposes of the invention.
ric and boric acids are not desirable
tomical and physiological reasons,
they may be used for technical
They are partly objectionable for
on that in the solution borates and
tes are generated, which, though not
s, have harmful effects upon the
ody.
further found that mixture of dry
or perborates and powdered in-
or organic acids remain stable for
time only, and subsequently decom-
sets in. This is also the case when
ig acid sodium sulfate, according
rmula:

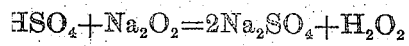

vent this slow decomposition, I have
fter many experiments, that an ad-
f about 10% of sodium chlorid is
to keep the powders in stable con-
idefinitely. Another means which
this slow decomposition is to make
mixtures in such a way that there is
excess of acid after dissolving.
ion is called to the fact that the
d peroxids are mixed with abso-
ry inorganic powders of the acid
r in such proportion that a neutral
acid reaction is obtained when a
is formed, an addition of 10% of
hlorid being given to the mixtures
its stable condition.
the foregoing it is obvious that the
nts employed in dry form, to which
hlorid is added, may be obtained in
f a known weight or the weight may
ed or stamped on the tablets, so that
easy matter to compute the amount
r required to obtain a solution of
n peroxid of required strength. The
uct $Na_2SO_4$ generated when the re-
akes place is a neutral inert body
efore is of no importance in carry-
my method.
ingredients used in dry form, of
nay be employed for other purposes,
ance, in connection with soap, soap
tooth powder, chewing gum, or
her chemicals for the purposes of
g the skin or for bleaching garments
estroy noxious odors, the main re-
quirement being the employment of ingredients which are in a perfect dry condition and which do not decompose irrespective of the length of time for which they are stored.

Theoretically,
240 lbs. of acid sulfate, chemically pure, and
78 lbs. of sodium peroxid, chemically pure, constituting a dry mixture of
318 lbs. will yield 34 lbs. of 100% hydrogen peroxid. To obtain the commercial 3% solution the concentrated product is diluted with a quantity of water which is $33\frac{1}{3}$ times the weight of the concentrated hydrogen peroxid being approximately 1133 lbs. that is, 318 lbs. of dry mixture (sodium peroxid and acid sodium sulfate) and 815 lbs. of water will yield about 1133 lbs. of 3% hydrogen peroxid. It may be stated that approximately one part of dry mixture and approximately 3 parts water yield 4 parts 3% hydrogen peroxid.

As has been previously mentioned to maintain the dry mixture in stable condition and to prevent decomposition the ingredients should be measured to produce a faint acid reaction after being dissolved in water and to this end the following quantities are cited by way of example:

241 lbs. acid sodium sulfate,
78 lbs. sodium peroxid
and about 6–20 lbs. common salt.

While the foregoing specification describes the preferred method of producing hydrogen peroxid, it is of course obvious that equivalents for the ingredients named may be used and that the proportions of the ingredients may be varied, and I therefore do not confine myself to the statements exactly as made, but want to avail myself of changes constituting departures within the scope of my invention as pointed out in the appended claims.

I claim:

1. In the method of producing hydrogen peroxid, the step of mixing an acid and a peroxid in perfectly dry condition and forming tablets thereof.

2. In the method of producing hydrogen peroxid, the step of mixing an acid and a peroxid in dry condition and in proportions to insure a slight excess of acid after dissolving in water, and forming tablets thereof.

3. In the method of producing hydrogen peroxid, the step of mixing an inorganic acid and a peroxid in dry condition, and adding an ingredient to prevent decomposition of the mixture and forming tablets thereof.

4. In the method of producing hydrogen peroxid, the step of mixing an inorganic acid and a peroxid in dry condition and in proportions to insure a slight excess of acid after dissolving in water, adding an ingredient to prevent decomposition of the mixture and forming tablets thereof.

5. In the method of producing hydrogen peroxid, the step of mixing an inorganic acid and a peroxid in dry condition, adding a haloid salt to prevent decomposition of the mixture and forming tablets thereof.

6. In the method of producing hydrogen peroxid, the step of mixing an acid and a peroxid in dry condition, adding an alkali metal salt to prevent decomposition of the mixture and forming tablets thereof.

7. In the method of producing hydrogen peroxid, the step of mixing a dry acid and a dry peroxid, adding sodium chlorid to prevent decomposition of the mixture and forming tablets thereof.

8. In the method of producing hydrogen peroxid, the step of mixing acid sodium sulphate in dry form with a dry peroxid in such proportions that there is a slight excess of acid when dissolving in water and forming tablets of the mixture.

9. In the method of producing hydrogen peroxid, the step of mixing acid sodium sulfate in dry form with a dry peroxid in such proportions that there is a slight excess of acid after dissolving in water, adding a haloid salt to prevent decomposition of the mixture and forming tablets thereof.

10. As a new product, a hydrogen peroxid developer composed of an inorganic acid, a peroxid and a haloid salt.

11. As a new product, a hydrogen peroxid developer comprising acid sodium sulfate, sodium peroxid and sodium chlorid.

12. As a new product, a hydrogen peroxid developer comprising acid sodium sulfate and sodium peroxid in proportions that there is a slight excess of acid in solution, and sodium chlorid.

PAUL PICKL.